July 30, 1957   J. F. CHAMBERLIN ET AL   2,800,950
SEAT FOR GOLF CART
Filed Dec. 17, 1954

INVENTORS
JOSEPH F. CHAMBERLIN
BY ROBERT A. WESTPHAL

ATTORNEY

United States Patent Office 2,800,950
Patented July 30, 1957

2,800,950

SEAT FOR GOLF CART

Joseph F. Chamberlin and Robert A. Westphal, Chicago, Ill.; said Westphal assignor to said Chamberlin Application December 17, 1954, Serial No. 475,885

5 Claims. (Cl. 155—78)

The invention relates to an improved seat for golf cart, and the present application for patent comprises an attachment for two prior patented devices of Joseph F. Chamberlin, both granted on January 27, 1953, one entitled "Foldable Golf Cart," Patent No. 2,626,814, and the other entitled "Collapsible Golf Cart," No. 2,626,815. The present application also contemplates an attachment for our joint patents, one entitled "Cart for Golf Bags," No. 2,741,490, granted April 10, 1956; and the other entitled "Collapsible Cart for Golf Bags," No. 2,740,638, granted April 3, 1956.

As the title indicates, the present invention relates to a seat for a golf cart or the like whereby the golfing user can remain comfortably seated during those inevitable times of waiting for the players ahead to move out of range or off the green.

One of the important objects of this invention is to provide in connection with a golf cart a seat which will not interfere in any way with the operation of the cart, but which will provide a ready and immediate resting place for the player whenever desired.

Another object of the invention is the provision of a golf cart seat so constructed that it can be readily applied to practically any of the carts now on the market.

A still further object of the invention is to provide a seat of the class described, which, when in use, is supported by one of the cart wheels and which automatically places a brake upon the wheels when the seat is occupied, thereby eliminating the danger of spills or upsets.

Yet another object of the invention is to provide a seat for golf carts which can be conveniently carried on the cart when not in use, and which can be immediately fitted on to one of the wheels when desired, and which furthermore is provided with an extendable auxiliary support which takes some of the weight of the occupant off of the wheels, and which further assures against undesired motion of the cart or wheel when the seat is being used.

Other and further important objects of the invention will be apparent from the disclosures in the accompanying drawing and following specification.

The invention, in a preferred form, is illustrated in the drawings and hereinafter more fully described.

In the drawings:

Figure 2 is a perspective view of the seat of Figure 1 looking at the same from underneath and showing it in position to be applied to the wheel of a golf cart or the like.

As shown in the drawings:

Figure 1:
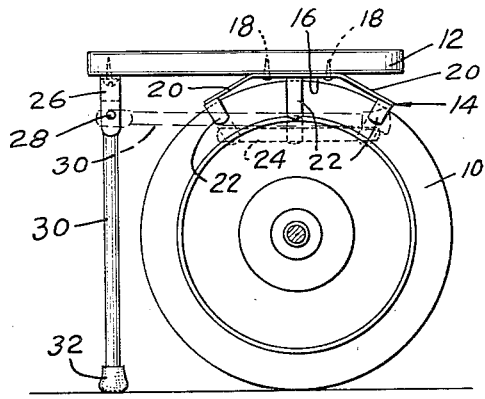
Figure 1 is a side elevation of the improved seat for golf cart of this invention, showing the same as applied to the wheel of a representative cart of this type.
Figure 3:
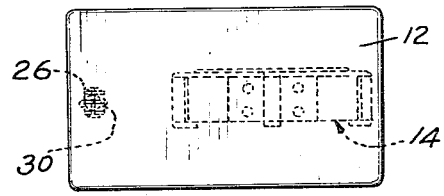
Figure 3 is a top plan view of the seat with the wheels and ground contacting structures shown in dotted lines.
Figure 4:
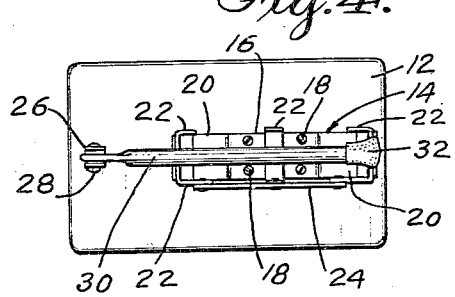
Figure 4 is a plan view of the seat taken from the underside thereof, and showing the same in folded position.
Figure 2:
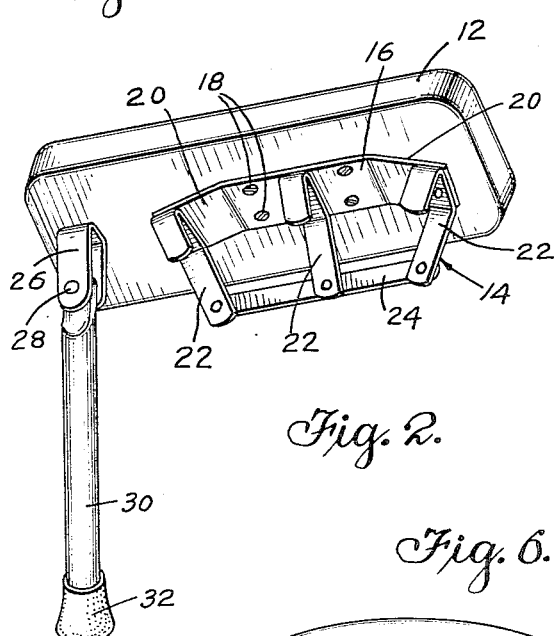
Figure 5:
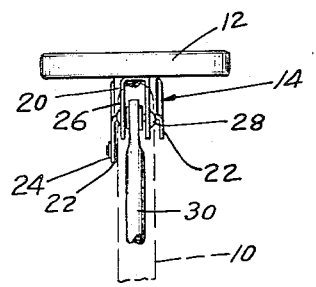
Figure 5 is an end view of the seat illustrating the same as applied to a wheel.

The reference numeral 10 indicates generally the wheel of a golf cart or the like to which the seat of this invention is adapted to be applied when the golfer or other user of the cart wishes to rest for a little time. The device itself comprises essentially a seat portion or platform 12 composed of wood, metal, plastic or the like, and in Figures 1-5 inclusive, the same is shown as rectangular, but other shapes may be employed.

In order to securely and quickly apply and fasten the same to the wheel 10, a wheel tire clamping bracket 14 is mounted on the under face of the seat, board or platform 12, this comprising essentially a main base plate or the like 16 having a flat portion adapted to be fastened to the material of the seat 12 by nails, screws, rivets or the like 18, and having two downwardly extending end portions 20 bent at an angle best shown in Figure 1 to more or less conform to the periphery of the wheel 10.

Fastened to the underface of the element 16—20 by spot-welding, riveting or the like, are three U-shaped elements 22, one leg of each of the elements being longer than the other, and with two of the elements fastened at the bent down ends 20 of the retaining strip and the third element fastened to the middle of the flat portion 16 of the strip. The longer ends of the U-shaped elements 22 are in alignment and are fastened together by a strip 24 which is joined to the corresponding ends of the elements 22, by riveting, spot-welding or the like. The U-shaped portions are of a width to readily but snugly fit over the tire of the wheel 10 so that both application and removal is simple and easy.

The bracket element 14 is preferably fastened slightly off-center of the platform 12, and at one end of this platform there is provided a U-shaped clip 26 securely fastened to the underface of the seat. This clip has aligned openings in the ends of its legs through which a pivot pin 28 passes, this pivot pin supporting a rod or leg 30, the end of which contacts the ground when the seat is in operative position. A ground contacting rubber shoe or the like 32 can be fitted on to the etnd of the leg 30. The pivot 28 permits the folding of the leg 30 into the position shown in Figure 4, whereby the entire device can be fitted into a small space and readily carried on the cart or in conjunction therewith. The dotted lines in Figure 1 also illustrate the folding operation, but, obviously, folding cannot be accomplished when the seat is in position on a wheel.

Figure 6:
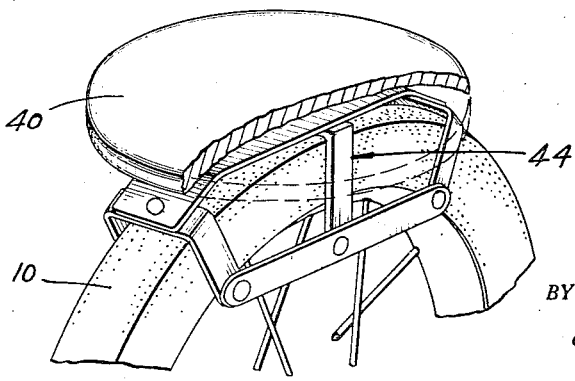
Figure 6 is a bottom view of a modified form of the seat construction.

A simplified modification of the invention is illustrated in Figure 6, wherein the seat is simply circular as shown at 40, and is provided with a wheel contacting and gripping element 44 substantially the same as the element 14 which is applied to the rectangular seat 12. In this device, the folding leg 30 is omitted and it has been found that this functions quite satisfactorily with little or no tendency of the wheel to rotate or lock.

It will be evident that herein is provided a simple, convenient and very economical golf cart seat which will prove quite a comfort to golfers using such carts, particularly when forced to wait over any substantial period of time, which waiting is almost inevitable on crowded golf courses. A chain, cord or light cable can be employed to fasten the seat to the cart so that it will not be forgotten or lost, and obviously the user of the cart cannot possibly push or pull the cart with the seat on the wheel as he will inevitably be reminded of its presence.

The foldable leg provides additional support in the event that this is desired or necessary, while at the same time adding very little to the weight or cost of the device. The spaces between the portions of the wheel contacting brackets 14 and 44 are such that the seat itself can be readily slipped over the handle of the cart so that it can be conveniently carried along with the cart while the same is in use, and such will not interfere with the operation of carts which fold or telescope. Further supports for the seat can be found or can be provided on the cart itself.

We are aware that many changes may be made and numerous details of construction varied throughout a wide range without departing from the principles of this invention, and we therefore do not propose limiting the patent granted hereon otherwise than as necessitated by the prior art.

We claim as our invention:

1. A seat for golf carts comprising a main platform, a wheel contacting and gripping bracket fastened to the under face of the platform, a ground contacting leg fastened to the platform adjacent one end thereof, the ground contacting leg being pivotally mounted for folding into the contacting and gripping bracket, the wheel contacting and gripping bracket comprising a rectangular plate having a flat portion fastened to the platform and having downwardly bent ends for a three-point contact with the wheel tire.

2. A device as described in claim 1 wherein three U-shaped brackets for tire clamping purposes are connected to the plate.

3. A device as described in claim 2, wherein the downwardly extending legs of all of the brackets are of unequal length and wherein the ends of certain of the legs are inter-connected.

4. A device as described in claim 3, wherein said connection includes a single straight metal strip.

5. A device as described in claim 4, wherein one of the U-shaped brackets is fastened to the middle of the rectangular plate and wherein the other two are fastened to the downwardly bent ends of said plate.

References Cited in the file of this patent

UNITED STATES PATENTS

| | | |
|---|---|---|
| 1,289,477 | Koster | Dec. 31, 1918 |
| 2,610,072 | Head | Sept. 9, 1952 |
| 2,673,589 | Kunkel | Mar. 30, 1954 |

FOREIGN PATENTS

| | | |
|---|---|---|
| 374,600 | Great Britain | June 16, 1932 |